United States Patent [19]
Niijima et al.

[11] Patent Number: 5,978,181
[45] Date of Patent: Nov. 2, 1999

[54] MAGNETIC HEAD AND MAGNETIC RECORDING/REPRODUCING APPARATUS

[75] Inventors: Masaaki Niijima; Yuji Sasaki, both of Kanagawa, Japan

[73] Assignee: Fujitsu Limited, Kawasaki, Japan

[21] Appl. No.: 08/947,114

[22] Filed: Oct. 8, 1997

[30] Foreign Application Priority Data

Mar. 4, 1997 [JP] Japan .................................. 9-048709

[51] Int. Cl.⁶ ...................................................... G11B 5/39
[52] U.S. Cl. ............................................................ 360/113
[58] Field of Search ..................................... 360/113, 128

[56] References Cited

U.S. PATENT DOCUMENTS

| | | | |
|---|---|---|---|
| 4,024,489 | 5/1977 | Bajorel et al. | 338/42 R |
| 5,465,186 | 11/1995 | Bajorek et al. | 360/113 |
| 5,539,598 | 7/1996 | Denison et al. | 360/113 |
| 5,638,237 | 6/1997 | Phipps et al. | 360/113 |
| 5,805,390 | 9/1998 | Takeura | 360/113 |

FOREIGN PATENT DOCUMENTS

| | | |
|---|---|---|
| 52-62417 | 5/1977 | Japan . |
| 3269815 | 12/1991 | Japan . |
| 5174333 | 7/1993 | Japan . |
| 6111250 | 4/1994 | Japan . |
| 6243434 | 9/1994 | Japan . |
| 785422 | 3/1995 | Japan . |

*Primary Examiner*—Robert S. Tupper
*Attorney, Agent, or Firm*—Greer, Burns & Crain, Ltd.

[57] ABSTRACT

A magnetoresistive magnetic head comprises a first magnetic shielding layer formed on an underlying layer, a first nonmagnetic insulating layer formed on the first magnetic shielding layer, a magnetoresistive device formed on the first nonmagnetic insulating layer, first and second leads formed on the first nonmagnetic insulating layer to be connected to both sides of the magnetoresistive device respectively, a second nonmagnetic insulating layer formed to cover the first and second leads and the magnetoresistive device, a second magnetic shielding layer formed on the second nonmagnetic insulating layer to be positioned over the magnetoresistive device, and a resistor element buried in at least one of the first and second nonmagnetic insulating layers to electrically connect the first lead to either the first magnetic shielding layer or the second magnetic shielding layer.

11 Claims, 11 Drawing Sheets

MAGNETIC HEAD AND MAGNETIC RECORDING/REPRODUCING APPARATUS

BACKGROUND OF THE INVENTION

1. Field of the Invention

The present invention relates to a magnetic head and a magnetic recording/reproducing apparatus and, more particularly, to a magnetic head employing a magnetoresistive effect and a magnetic recording/reproducing apparatus equipped with such magnetic head.

2. Description of the Prior Art

In a magnetic disk drive, magnetic information are written/read into/from a magnetic disk by virtue of the magnetic head.

Figure 13:
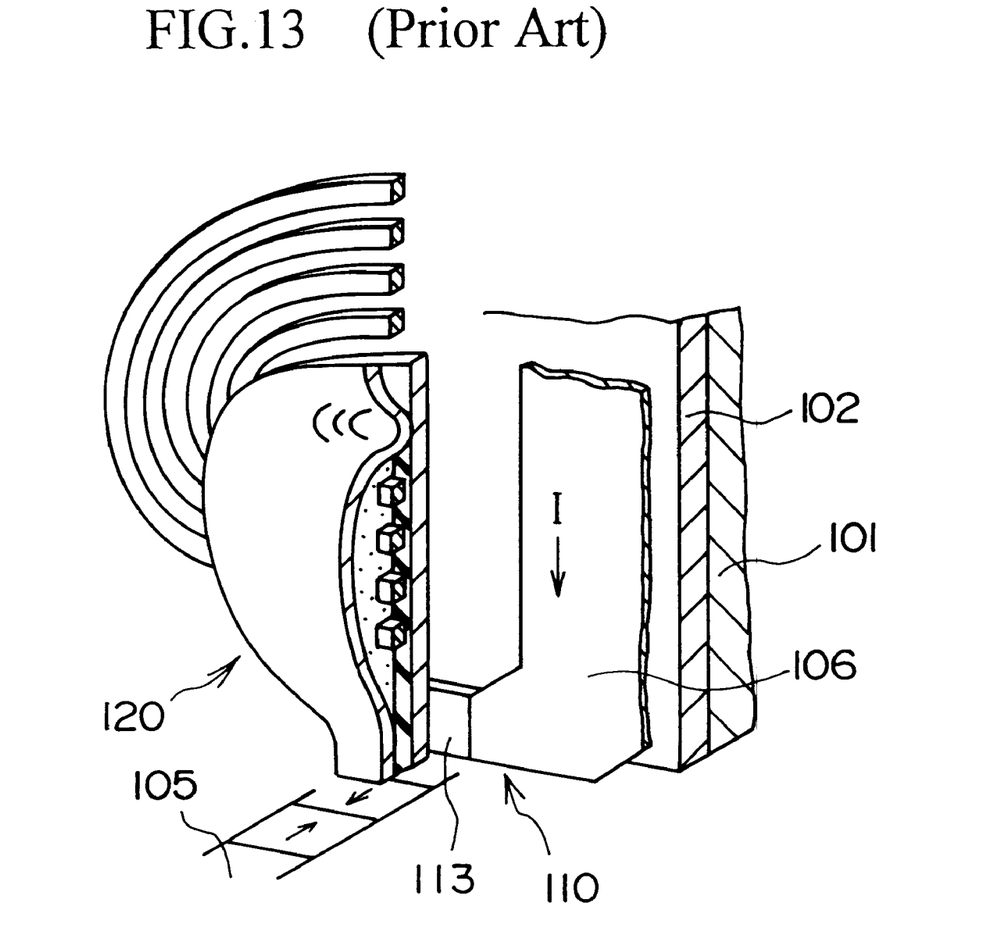
FIG. 13 is a perspective view, partially cut out, showing a recording/reproducing magnetic head in the prior art.

As shown in FIG. 13, for example, the magnetic head installed in the magnetic disk drive has such configuration a that both a magnetoresistive (MR) head 110 and an induction type head 120 are placed on a head substrate 101. In this configuration, the induction type head 120 is used to record the magnetic information into the magnetic disk, and the MR head 110 is used to reproduce the magnetic information from the magnetic disk.

Figure 14A:
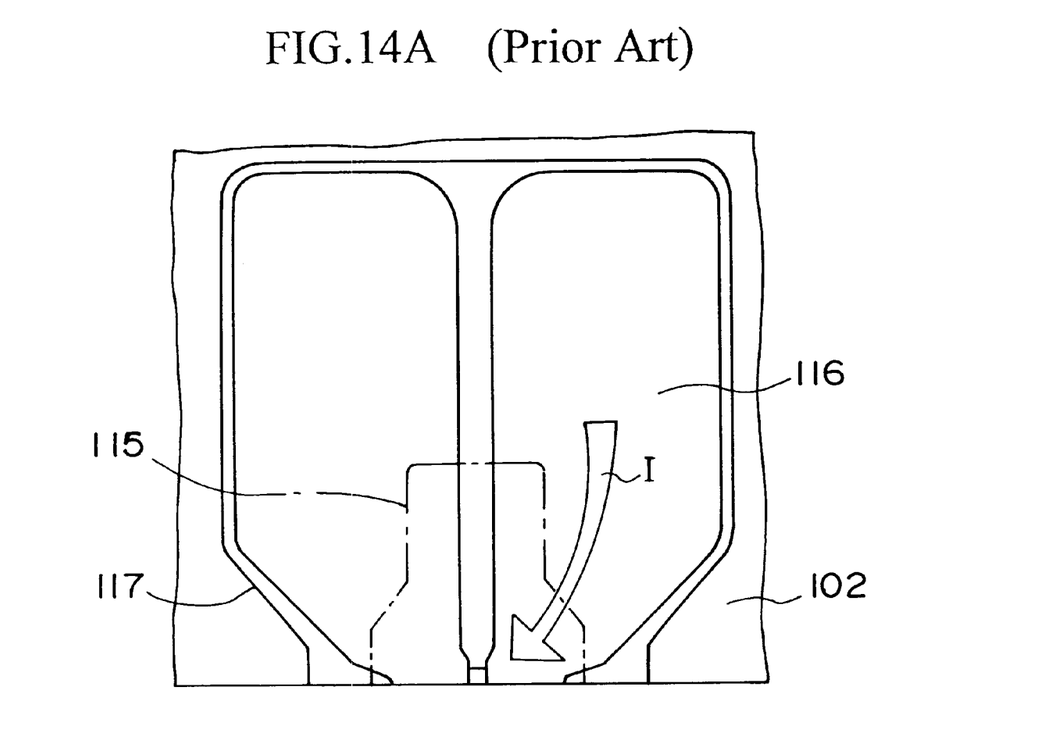
FIG. 14A is a plan view showing a placement between a magnetoresistive device and two magnetic shielding layers and two leads, other than nonmagnetic insulating layers, of a magnetoresistive head in the prior art.
Figure 14B:
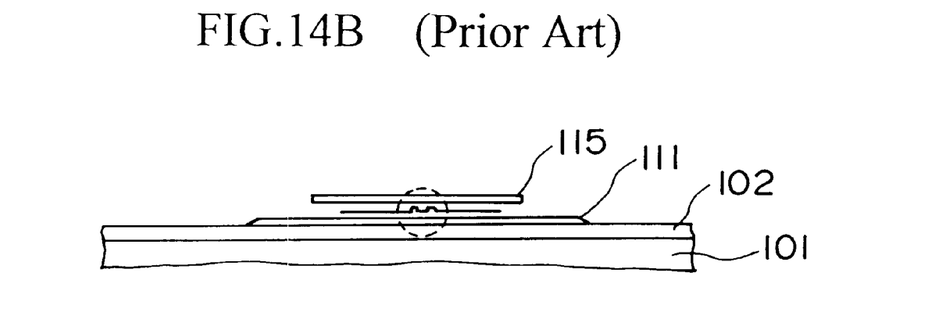
FIG. 14B is an end view showing a placement between the magnetoresistive device and the leads and the magnetic shielding layers of the magnetoresistive head in the prior art.
Figure 15:
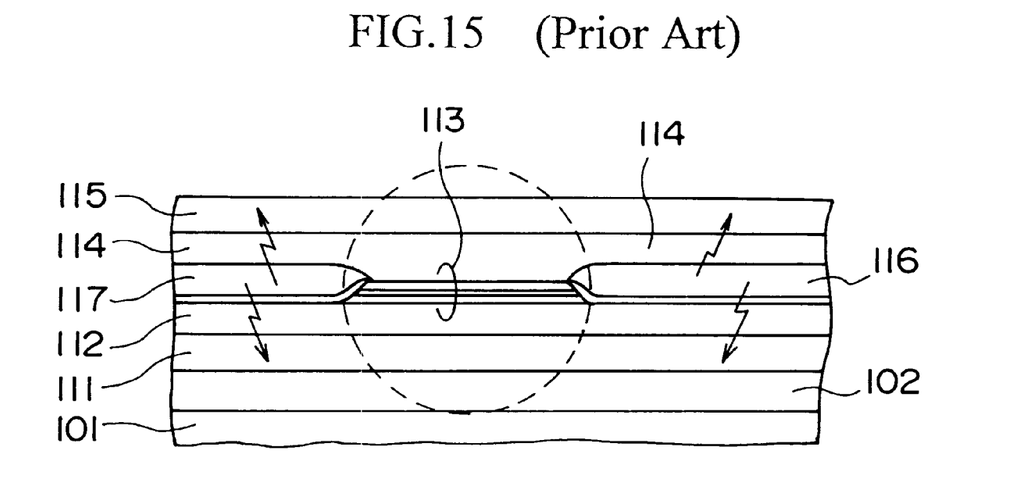
FIG. 15 is an end view showing an end surface of the magnetoresistive head in the prior art.

A configuration as illustrated in FIGS. 14A and 14B and FIG. 15 has been employed as the MR head 110. FIG. 14A shows a planar placement of respective layers of the MR head 110 other than nonmagnetic insulating layers. FIG. 14B shows a layer structure of the MR head 110 except for the nonmagnetic insulating layers. FIG. 15 shows an end surface of the MR head 110, wherein a portion encircled with a broken line corresponds to a portion encircled with a broken line in FIG. 14B.

In FIGS. 14A, 14B and 15, a substrate protection insulating layer 102 is formed on a head substrate 101. Then, a lower magnetic shielding layer 111, a lower nonmagnetic insulating layer 112, a magnetoresistive device 113, an upper nonmagnetic insulating layer 114, and an upper magnetic shielding layer 115 are formed on the substrate protection insulating layer 102.

The magnetoresistive device 113 is formed to have a three-layered structure consisting of, for example, a soft magnetic layer, a magnetic separating layer, a magnetoresistive layer made of NiFe. First and second hard magnetic layers are formed respectively on both sides of the three-layered structure. Both the first and second hard magnetic layers are magnetized along the direction from the first hard magnetic layer to the second hard magnetic layer. First and second leads 116, 117 are formed between the lower nonmagnetic insulating layer 112 and the upper nonmagnetic insulating layer 114 and are connected to both sides of the magnetoresistive device 113 respectively.

In such a magnetoresistive head 110, when a sense current (constant current) is supplied to the magnetoresistive device 113 via the first and second leads 116, 117, a change in the electric resistance caused by a change in the magnetization direction by an external magnetic field is transmitted to a signal processing circuit (not shown) via the first and second leads 116, 117. Such change in the electric resistance appears as a change in voltage between the first and second leads 116, 117.

Accordingly, the first and second leads 116, 117 formed on both sides of the magnetoresistive device 113 have a function of supplying the sense current to the magnetoresistive device 113 and a function of applying a detected voltage.

The first and second leads 116, 117 are formed to have sufficiently large areas and thicknesses but small electric resistivity rather than the magnetoresistive device 113. For this reason, a total sum of the electric resistance of the first and second leads 116, 117 and the magnetoresistive device 113 can be substantially determined by the electric resistance value of the magnetoresistive device 113. Such electric resistance is set to about 20 to 40Ω.

In FIG. 13, a reference numeral 105 denotes a magnetic disk.

The magnetoresistive magnetic head having the above configuration, before being mounted on a magnetic disk drive, is easily destroyed by static electricity. Reasons for this phenomenon will be put forth in the following.

First, when large static electricity is applied to the first lead 116, the static electricity moves from the first lead 116 toward the second lead 117 due to their potential difference, as indicated by an arrow I in FIG. 14A. In this event, the static electricity passes through the magnetoresistive device 113 as an electric route, and therefore the magnetoresistive device 113 becomes easily destroyed by the static electricity since it has larger electric resistance than the two leads 116, 117.

Then, as shown in FIG. 15, since the first and second leads 116, 117 and the lower and upper magnetic shielding layers 111, 115 may serve as electrodes while the lower and upper nonmagnetic insulating layer 112, 114 may serve as dielectric substances between them, parasitic capacitances may be formed. If the static electricity that is larger than an allowable value of the parasitic capacitance is accumulated between these electrodes, sometimes dielectric breakdown of the lower and upper nonmagnetic insulating layer 112, 114 may be caused by discharge of such static electricity. Discharging directions of the static electricity are indicated by arrows in FIG. 15.

In this manner, the reason why the static electricity enters into the first and second leads 116, 117 is that at first the static electricity enters into electrode pads (not shown) which are arranged on the magnetic head to be exposed to the outside, and then the static electricity moves to the first and second leads 116, 117 via wirings which are connected to the electrode pads.

As has been shown in Figures of Patent Application Publication (KOKAI) 6-243434, it may be thought out that a resistive film is coated on overall exposed ends of the magnetoresistive device in the magnetoresistive magnetic head, and then the leads are connected to the lower and upper magnetic shielding layers via the resistive film. However, according to such configuration, the static electricity accumulated in the leads is always discharged to the resistive film via the magnetoresistive device. Hence, such configuration is not preferable since it is likely that the magnetoresistive device is destroyed upon discharge of the static electricity.

SUMMARY OF THE INVENTION

It is an object of the present invention to provide a magnetic head which is capable of preventing electrostatic breakdown of both a magnetoresistive device and nonmagnetic insulating layers formed on and beneath the magnetoresistive device, and a magnetic recording/reproducing apparatus equipped with such magnetic head.

According to an aspect of the present invention, resistors for preventing electrostatic discharge damage with high resistance are buried in nonmagnetic insulating layers which are put respectively between a lead connected to a magnetoresistive device and upper and lower magnetic shielding layers which are formed over and under the lead, so that the lead and the upper and lower magnetic shielding layers are electrically connected to each other via the resistor elements.

Therefore, when static electricity accumulated in the lead becomes larger than an allowable capacitance of respective parasitic capacitors which are formed between the lead and the upper and lower magnetic shielding layers, such static electricity is discharged to the upper and lower magnetic shielding layers via the resistors for preventing electrostatic discharge damage. As a result, dielectric breakdown of the nonmagnetic insulating layers can be prevented and thus electrostatic breakdown of the magnetic head can also be prevented.

According to another aspect of the present invention, in a magnetic head which comprises the first and second leads connected to a magnetoresistive device, upper and lower magnetic shielding layers formed to oppose a pair of leads in the film thickness direction, and nonmagnetic insulating layers formed between the first and second leads and the upper/lower magnetic shielding layers, a plurality of resistors for preventing electrostatic discharge damage are buried in the nonmagnetic insulating layers, so that the first lead and the second lead are connected electrically mutually via the resistors for preventing electrostatic discharge damage and the upper and lower magnetic shielding layers.

If large static electricity is applied to a first electrode pad connected to the first lead, such static electricity is moved to a second lead and a second electrode pad connected to the second lead via one of the leads, the magnetic shielding layer, and the resistors for preventing electrostatic discharge damage.

The magnetoresistive device is connected to top ends of the first and second leads, and the first electrode pad is connected to the first lead, and the second electrode pad is connected to the second lead. Two electric routes are formed from the first electrode pad to the second electrode pad through the magnetoresistive device or the resistor for preventing electrostatic discharge damage. Since a distance of an electric route which passes through the resistors for preventing electrostatic discharge damage and the upper and lower magnetic shielding layers is shorter than a distance of an electric route which passes through the magnetoresistive device, the static electricity does not pass through the magnetoresistive device. In this case, it is preferable that a resistance value of the electric route including the resistors for preventing electrostatic discharge damage is set, e.g., about 100 times higher than a resistance value of the electric route formed between the leads including the magnetoresistive device.

In addition, the static electricity is easy to move via the route having the short distance rather than the route having the small resistance value. In other words, the static electricity which enters into the electrode pad exposed to the outside passes easily through the high resistance resistors being inserted in the electric circuit which is positioned close to the electrode pad rather than the location of the magnetoresistive device, whereby electrostatic breakdown of the magnetoresistive device can be prevented.

Even if the resistance value of the resistor for preventing electrostatic discharge damage is set to such an extent, a rate of reduction of the sense current which are supplied to the magnetoresistive device via the leads is no more than about 1%. Therefore, there is caused no problem in practical use.

In such configuration, the static electricity may be sometimes discharged from the leads to the magnetic shielding layers. However, since such static electricity can be discharged to the magnetic shielding layers via the resistors for preventing electrostatic discharge damage provided in the nonmagnetic insulating layers, electrostatic breakdown of the nonmagnetic insulating layers formed between the leads and the magnetic shielding layers can be prevented.

According to still another aspect of the present invention, an electrostatic breakdown preventing resistor element is connected between the first and second electrode pads which are extended outwardly from the first and second leads connected to both sides of a magnetoresistive device. Since the static electricity applied to the first electrode pad moves to the second electrode pads via the electrostatic breakdown preventing resistor element which is provided in a short distance electric route between the electrode pads, such static electricity never passes through the magnetoresistive device.

In this case, if a resistance value of the electrostatic breakdown preventing resistor element is set, e.g., 100 times higher than a resistance value of an electric route including the magnetoresistive device, an electric current passing through the electrostatic breakdown preventing resistor element can be limited to no more than about 1% of an electric current flowing through the magnetoresistive device upon supplying a sense current. Hence, there is caused no problem in practical use.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DESCRIPTION OF THE PREFERRED EMBODIMENTS

Various embodiments of the present invention will be described with reference to the accompanying drawings. It should be noted that the same or similar reference numerals are applied to the same or similar parts and elements throughout the drawings, and the description of the same or similar parts and elements will be omitted or simplified.

First Embodiment

Figure 1:
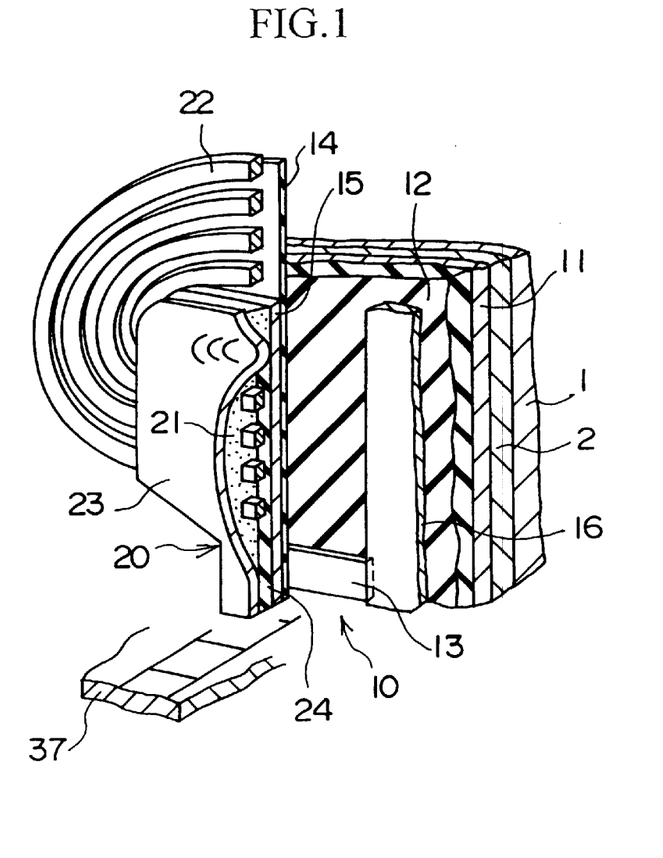
FIG. 1 is a perspective view, partially in section, showing a magnetoresistive head and an induction type head according to a first embodiment of the present invention.
Figure 2:
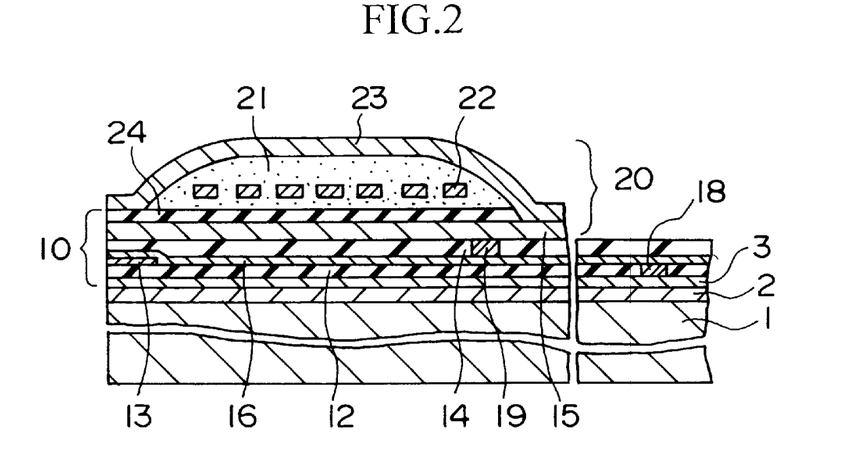
FIG. 2 is a sectional view showing the magnetoresistive head and the induction type head according to the first embodiment of the present invention.

FIG. 1 is a perspective view, partially in section, showing an example of a magnetic head according to a first embodiment of the present invention. FIG. 2 is a sectional view showing the magnetic head in FIG. 1.

In FIGS. 1 and 2, a magnetoresistive (MR) head 10 for use in reproduction only and an induction type magnetic head 20 for use in recording only are formed in sequence on a head substrate 1 via a substrate protection layer 2 made of $Al_2O_3$.

The MR head 10 comprises a lower magnetic shielding layer 11 made of NiFe, a lower nonmagnetic insulating layer 12 made of $Al_2O_3$, a magnetoresistive device 13, an upper nonmagnetic insulating layer 14 made of $Al_2O_3$, and an upper magnetic shielding layer 15 made of NiFe, which are all formed in sequence on the substrate protection layer 2. The lower and upper nonmagnetic insulating layers 12, 14 are formed to have a thickness of 100 to 150 nm, respectively.

Figure 3:
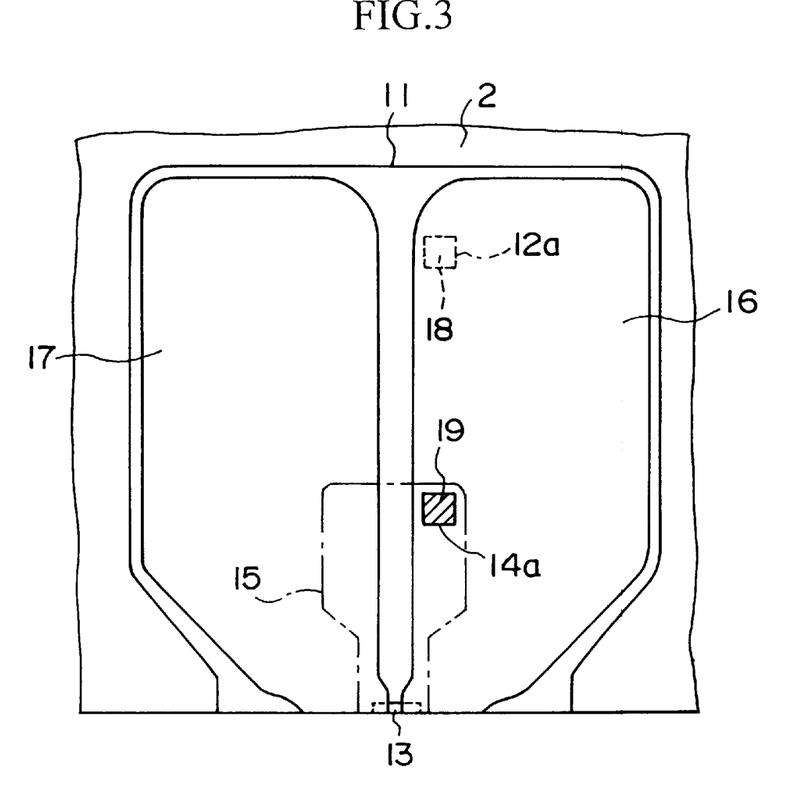
FIG. 3 is a plan view showing placement between a magnetoresistive device and two magnetic shielding layers and two leads, other than nonmagnetic insulating layers, of the magnetoresistive head according to the first embodiment of the present invention.

As shown in FIG. 3, the upper magnetic shielding layer 15 is formed to spread over the magnetoresistive device 13 and its neighboring area and to oppose a part of the lower magnetic shielding layer 11.

As shown in FIGS. 1 to 4, the first and second leads 16, 17 made of gold (Au) are connected to both sides of the magnetoresistive device 13 which is put between the lower nonmagnetic insulating layer 12 and the upper nonmagnetic insulating layer 14. The first and second leads 16, 17 formed on the lower magnetic shielding layer 11 are formed to protrude from the upper magnetic shielding layer 15.

A first opening 12a having an area of about 100 $\mu m^2$ is formed in a certain region of the lower nonmagnetic insulating layer 12 located beneath the first lead 16. A first resistor element 18 with a resistance value of 100 kΩ to several MΩ is filled in the first opening 12a. As a result, the lower magnetic shielding layer 11 and the first lead 16 are electrically connected via the first resistor element 18. In FIG. 3, the first opening 12a is formed on the outside of the upper magnetic shielding layer 15.

Figure 4:
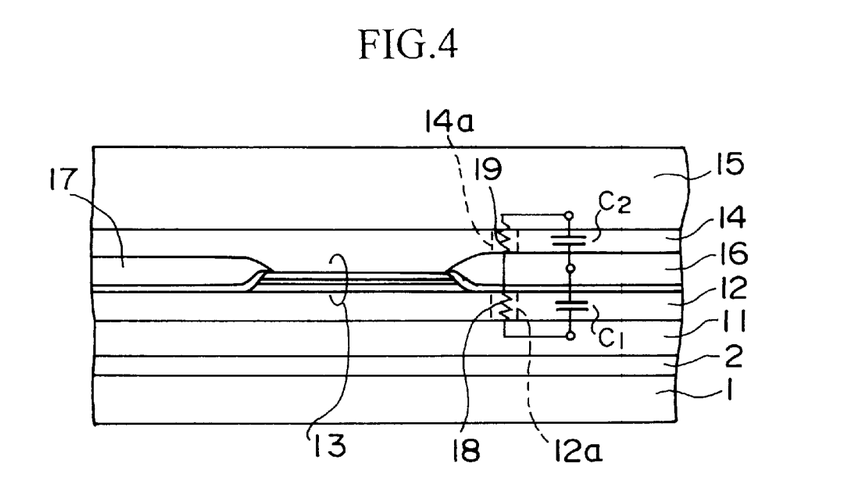
FIG. 4 is a front view showing an end surface of the magnetoresistive head according to the first embodiment of the present invention, and connection relationships of parasitic capacitances and resistors for preventing electrostatic discharge damage formed between one of two leads and two magnetic shielding layers.

A second opening 14a is formed in a certain region of the upper nonmagnetic insulating layer 14 that is separated from the magnetoresistive device 13. A second resistor element 19 with a resistance value of 100 kΩ to several MΩ is filled in the second opening 14a. As a result, the upper magnetic shielding layer 15 and the first lead 16 are electrically connected via the second resistor element 19.

The first and second resistor elements 18, 19 are formed by filling conductive material in the first and second openings 12a, 14a respectively. Materials having large electric resistance such as nichrome, constantan, manganese, or the like may be employed as the conductive material. In addition, materials may be selected which have electric resistivity smaller than the lower and upper nonmagnetic insulating layers 12, 14.

Alternatively, a part of the upper magnetic shielding layer 15 may be employed as the second resistor element 19 by filling the second opening 14a with the part of the upper magnetic shielding layer 15. In this case, a resistance value can be set by adjusting an opening area of the second opening 14a.

In the magnetoresistive magnetic head 10 having such a configuration, a parasitic capacitance C1 is made up of the first lead 16, the first magnetic shielding layer 11, and the lower nonmagnetic insulating layer 12. The static electricity accumulated in the first lead 16 can be discharged in the following manner.

At first, the static electricity accumulated in the first lead 16, if increased higher than a storage capacitance of the parasitic capacitance C1, is discharged to the lower magnetic shielding layer 11 via the first resistor element 18 which can serve as a local resistor having a low resistance value. Therefore, the static electricity does not flow through the lower nonmagnetic insulating layer 12.

Like the above, another parasitic capacitance C2 is formed between the upper magnetic shielding layer 15 and the first lead 16. If the static electricity in excess of a storage capacitance of the parasitic capacitance C2 is accumulated in the first lead 16, it can be discharged to the upper magnetic shielding layer 15 via the second resistor element 19.

In this manner, dielectric breakdown of the lower and upper nonmagnetic insulating layers 12, 14 can be prevented by discharging the static electricity via the first and second resistor elements 18, 19.

In the meanwhile, since resistance values of the first lead 16 and the lower magnetic shielding layer 11 are more than 100 times higher than a resistance value of the magnetoresistive device 13 being formed between the first lead 16 and the second lead 17, neither a sense current passed through the magnetoresistive device 13 nor a rate of change in the electric resistance against an external signal magnetic field would be reduced. Furthermore, the same results can be achieved between the first lead 16 and the upper magnetic shielding layer 15. Accordingly, no current except for the static electricity would flow into the lower and upper magnetic shielding layer 11 and 15.

Consequently, even if the foregoing configuration is adopted, no substantial trouble is caused in detecting the signal magnetic field by virtue of the magnetoresistive magnetic head.

Next, a step of forming the first resistor element 18 in the first opening 12a will be explained in brief hereinafter.

Figure 5A:
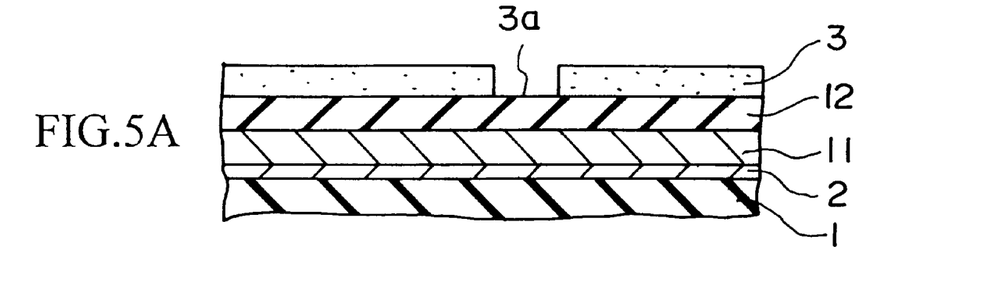
FIGS. 5A to 5D are sectional views showing steps of forming an opening in the nonmagnetic insulating layer and then filling the opening with the resistors for preventing electrostatic discharge damage, in manufacturing steps of the magnetoresistive head according to the first embodiment of the present invention.

First, steps of achieving a configuration shown in FIG. 5A will be explained hereunder.

Figure 5B:
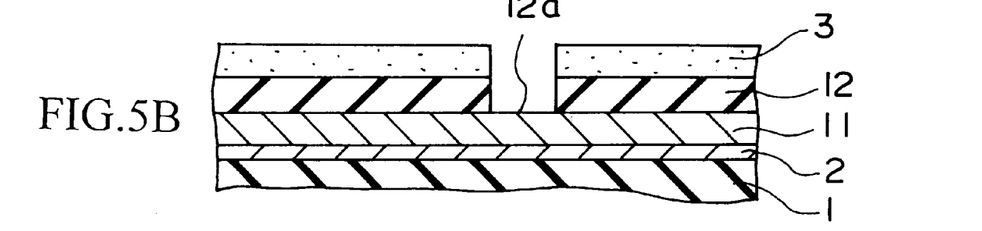

The lower nonmagnetic insulating layer 12 is formed on the lower magnetic shielding layer 11 having a substantially hexagonal planar shape. A photoresist 3 is then coated on the lower nonmagnetic insulating layer 12. A window 3a is formed in a part of the lead forming region by exposing and then developing the photoresist 3. In turn, as shown in FIG. 5B, the first opening 12a is formed in the lower nonmagnetic insulating layer 12 by etching the lower nonmagnetic insulating layer 12 through the window 3a.

Figure 5C:
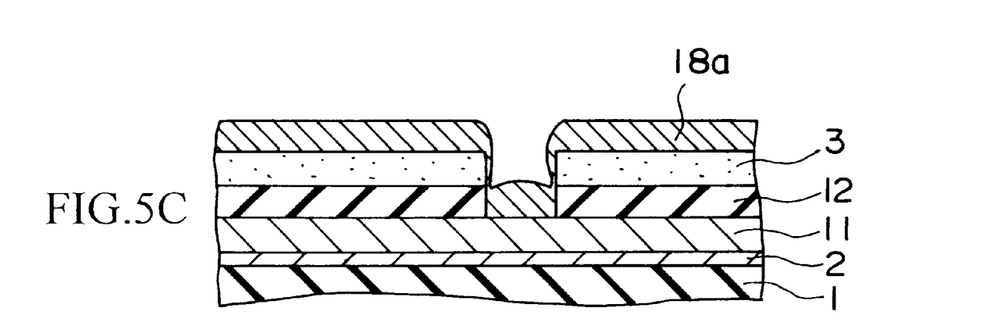
Figure 5D:
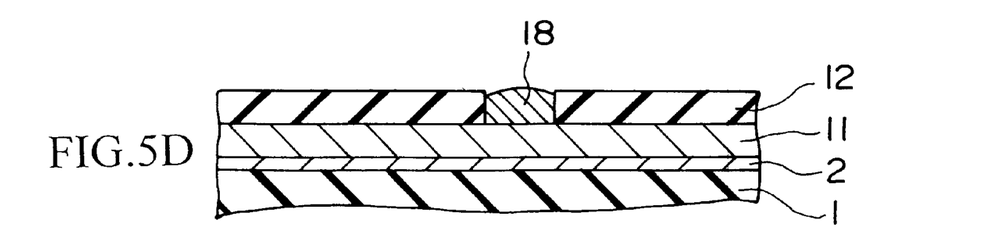

Subsequently, as shown in FIG. 5C, a film 18a made of electrically resistive material such as tungsten, tantalum, or the like is formed on the photoresist 3 and in the window 3a by virtue of sputtering, etc. Then, after the photoresist 3 is removed by solvent, the film 18a made of electrically resistive material remains only in the first opening 12a. Then, as shown in FIG. 5C, the film 18a made of electrically resistive material in the first opening 12a can be used as a first resistor element 18.

In the event that a second resistor element 19 is formed in the second opening 14a, it can be formed via the same steps as above.

In any way, as the magnetoresistive device 13, there are an isotropic magnetoresistive device wherein a change in the electric resistance can be detected depending upon an angle between the magnetization direction and the direction of current flow, a spin valve magnetoresistive device wherein a change in the electric resistance can be detected depending upon a relative angle between respective magnetization directions of two magnetic layers, and the like.

Figure 6A:
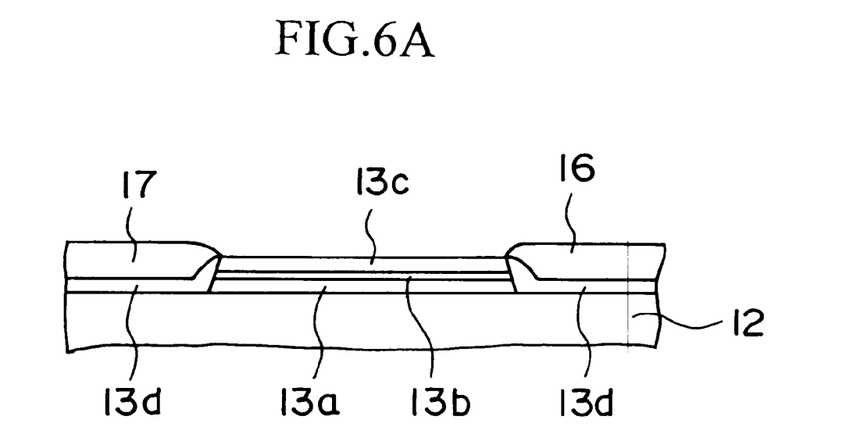
FIGS. 6A and 6B are front views showing concrete examples of the magnetoresistive device according to the first embodiment of the present invention.

The isotropic magnetoresistive device is formed to have a configuration as shown in FIG. 6A, for example. In FIG. 6A, the isotropic magnetoresistive device has a three-layered configuration comprising a SAL (Soft Adjacent Layer) 13a made of nickel-iron-chromium (NiFeCr), a magnetic separating layer 13b made of tantalum (Ta), tungsten (W), or the like, and a magnetoresistive (MR) layer 13c made of nickel-iron (NiFe). Two hard magnetic layers 13d made of cobalt-iron (CoFe) are connected to both sides of the isotropic magnetoresistive device. Such two hard magnetic layers 13d are magnetized along the direction from one end to the other end of the MR layer 13c. The first lead 16 and the second lead 17 are connected to these hard magnetic layers 13d respectively.

Figure 6B:
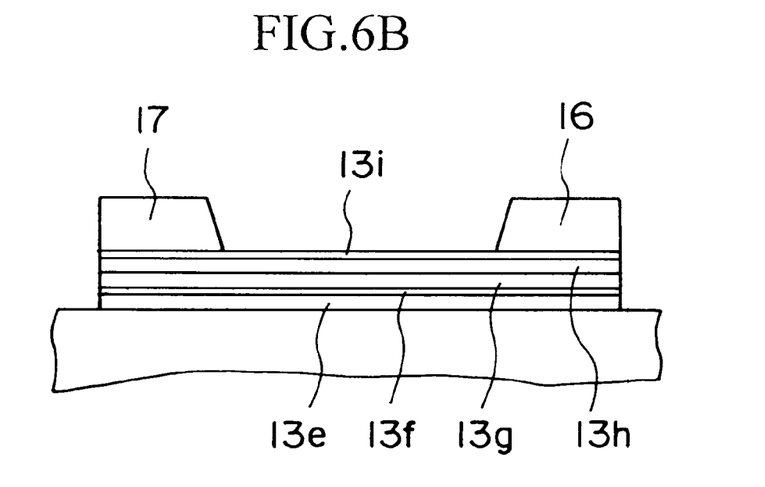

The spin valve magnetoresistive device is formed to have a configuration, as shown in FIG. 6B, wherein two soft magnetic layers 13e, 13g made of NiFe are isolated by a magnetic separating layer 13f made of copper. A magnetic domain controlling layer 13h is connected to an upper soft magnetic layer 13g. The upper soft magnetic layer 13g is magnetized along the direction from one end to the other end of the magnetic domain controlling layer 13h by virtue of its exchange coupling with the magnetic domain controlling layer 13h. The magnetic domain controlling layer 13h is covered with a protection film 13i made of tantalum (Ta), or the like. The first and second leads 16, 17 are connected to neighboring areas of both ends of the spin valve magnetoresistive device.

Such magnetoresistive device 13 is formed to be miniaturized such that its height is less than 2.0 $\mu$m and its length between the two leads is less than 3 $\mu$m.

An induction type magnetic head 20 which is formed on the magnetoresistive head 10 constructed as above, as shown in FIGS. 1 and 2, employs the upper magnetic shielding layer 15 as a first magnetic pole layer. An insulating layer 21 is formed on the upper magnetic shielding layer 15. Spiral coils 22 are arranged to penetrate the insulating layer 21. A second magnetic pole layer 23 is formed on the insulating layer 21. A part of the second magnetic pole layer 23 is passed through a substantially central clearance of the spiral coils 22 to be connected to the upper magnetic shielding layer 15. The second magnetic layer 23 and the upper magnetic shielding layer 15 are separated from each other at a certain distance over the magnetoresistive device 13 to put a nonmagnetic gap layer 24 therebetween.

Figure 7:
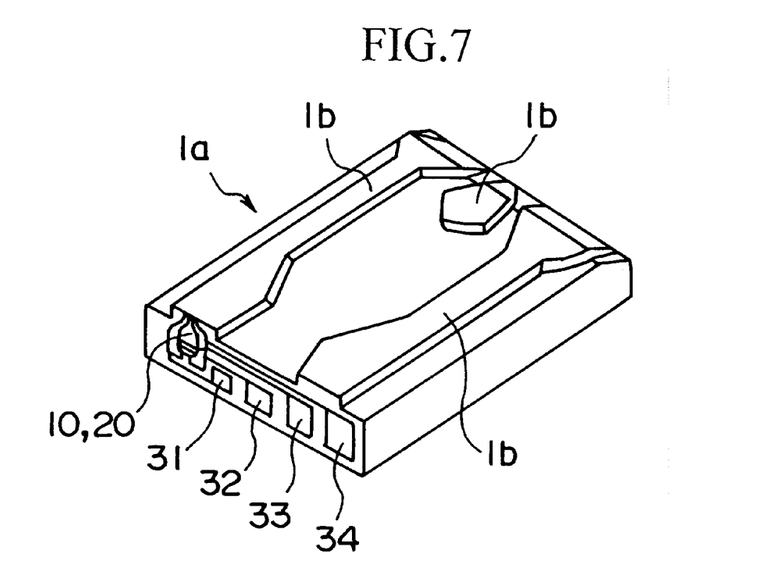
FIG. 7 is a perspective view showing a head slider on which the magnetoresistive device according to the first embodiment of the present invention is formed.

The head substrate 1 on which the MR magnetic head 10 and the induction type magnetic head 20 are formed is worked into a shape shown in FIG. 7 to thus form a head slider 1a. The head slider 1a has a plurality of air bearing surfaces 1b. The MR magnetic head 10 and the induction type magnetic head 20 are formed on a rear end surface of the air bearing surfaces 1b. In addition, first to fourth electrode pads 31 to 34 are formed on the rear end surface. The first and second leads 16, 17 of the MR head 10 are electrically connected to the first and second electrode pads 31, 32 via the wirings respectively. Both ends of the spiral coils 22 of the induction type magnetic head 20 are electrically connected to the third and fourth electrode pads 33, 34 via the wirings respectively.

Figure 8:
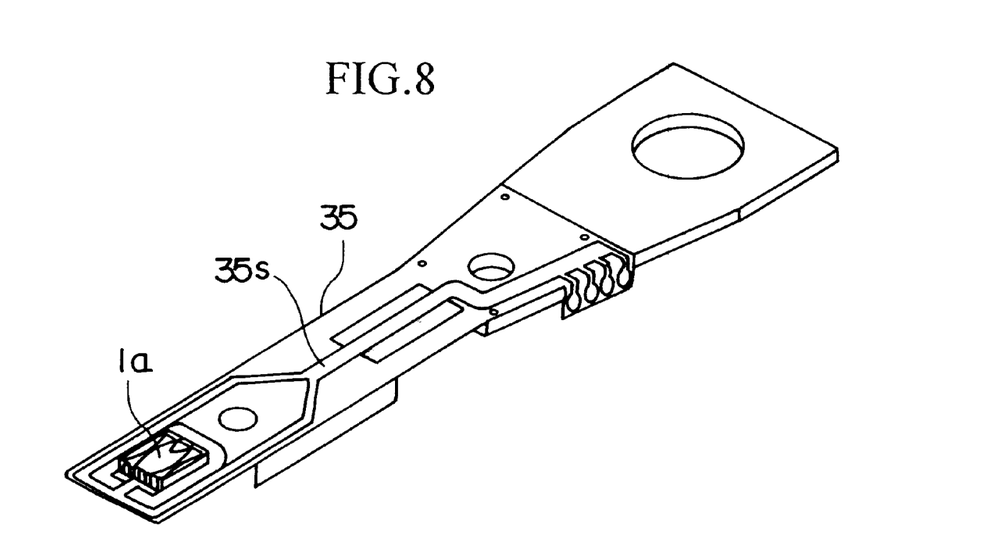
FIG. 8 is a perspective view showing an arm of the magnetic disk drive on which the head slider shown in FIG. 7 is mounted.
Figure 9:
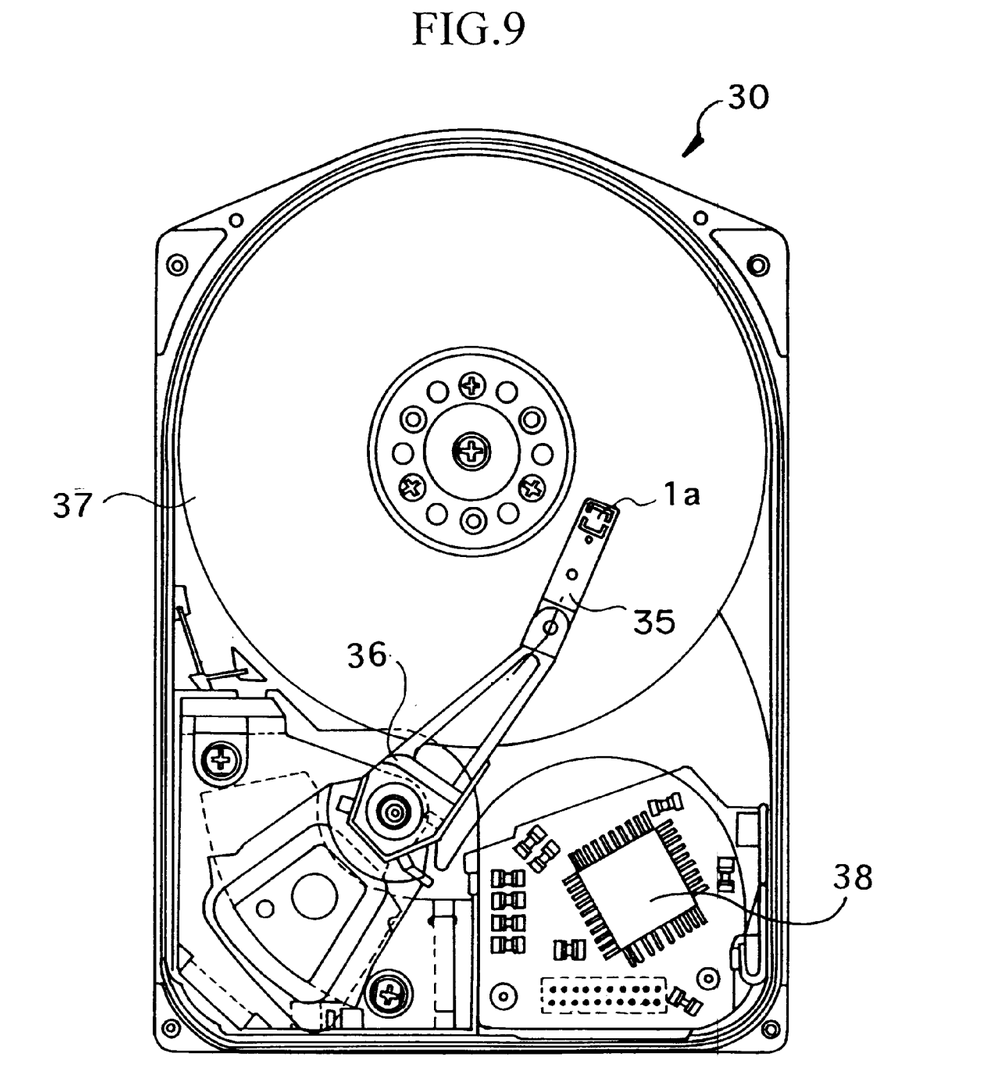
FIG. 9 is a plan view showing the magnetic disk drive on which the head slider shown in FIG. 7 is mounted.

Such head slider 1a is fitted onto a top end of an arm 35 shown in FIG. 8. The arm 35 is attached to an actuator 36 of a magnetic disk drive 30 shown in FIG. 9. The arm 35 is shifted over the magnetic disk 37 in terms of a lateral movement of the actuator 36. The first to fourth electrode pads 31 to 34 which are provided on the head slider 1a secured to the top end of the arm 35 are connected electrically to a semiconductor integrated circuit device 38 via a wiring sheet 35s being placed on the arm 35.

In FIG. 3, two resistor elements 18, 19 have been provided on and beneath the first lead 16. However, in the case that one of the two resistor elements 18, 19 is omitted, electrostatic breakdown of the nonmagnetic insulating layers 12, 14 can also be prevented.

Second Embodiment

The configuration according to the first embodiment is designed to prevent electrostatic breakdown of the nonmagnetic insulating layer in the case that the static electricity is accumulated gradually in the lead 16 via the first electrode pad 31.

However, if the static electricity applied to the first electrode pad 31 or the second electrode pad 32 at a time is large, such a phenomenon occurs that the static electricity moves from the first lead 16 to the second lead 17 via the magnetoresistive device 13. It is likely that the magnetoresistive device 13 is destroyed upon a movement of the static electricity.

In order to prevent destruction of the magnetoresistive device 13 by virtue of such static electricity, a configuration shown in FIGS. 10 and 11 will be employed, as will be explained hereunder.

Figure 10:
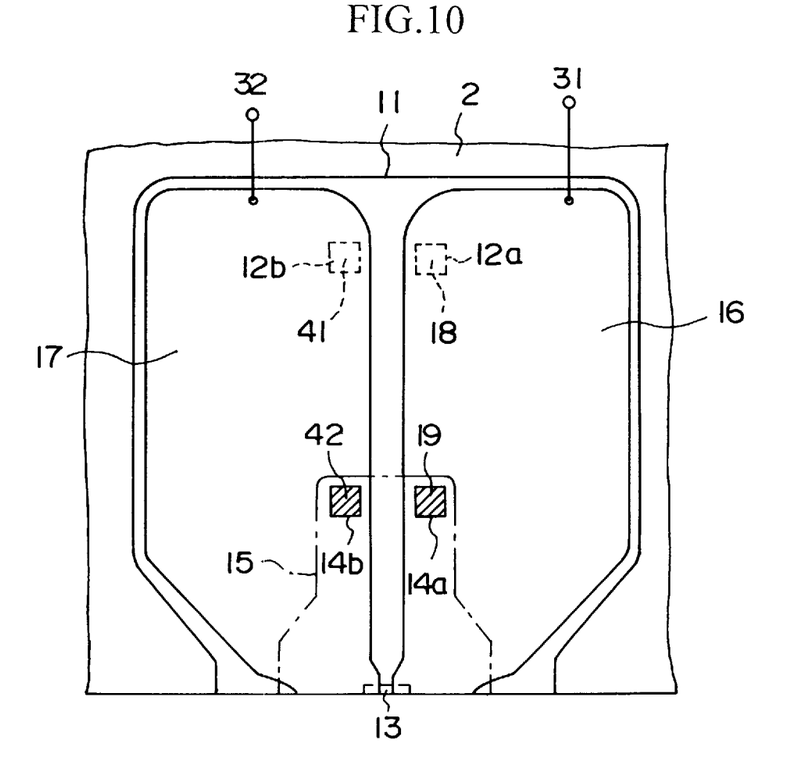
FIG. 10 is a plan view showing placement between a magnetoresistive device and two magnetic shielding layers and two leads, other than nonmagnetic insulating layers, of a magnetoresistive head according to a second embodiment of the present invention.
Figure 11:
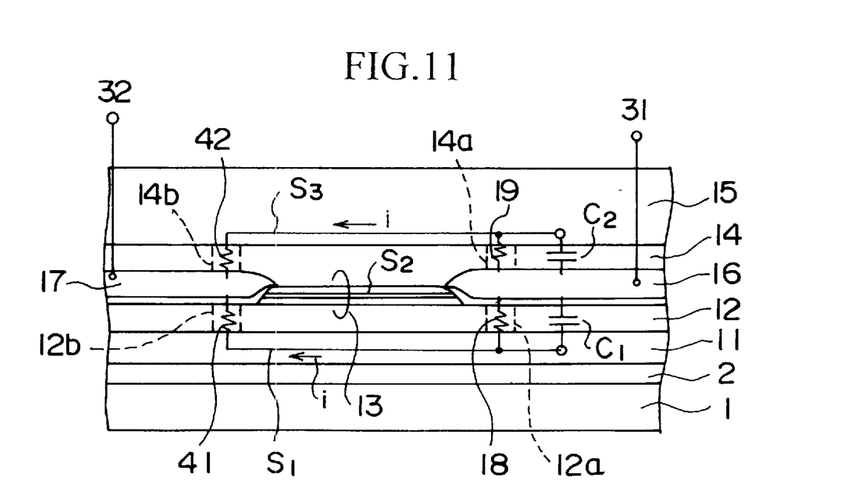
FIG. 11 is a front view showing an end surface of the magnetoresistive head according to the second embodiment of the present invention, and connection relationships of parasitic capacitances and resistor elements for preventing electrostatic breakdown formed between one of two leads and two magnetic shielding layers.

In FIGS. 10 and 11, an example is shown in which resistors for preventing electrostatic discharge damage are formed not only on and beneath the first lead 16, as in the first embodiment, but also on and beneath the second lead 17.

In other words, a third opening 12b is formed in the lower nonmagnetic insulating layer 12 between the second lead 17 and the lower magnetic shielding layer 11. A third resistor element 41 is filled in the third opening 12b. Thus the second lead 17 and the lower magnetic shielding layer 11 can be electrically connected to each other via the third resistor element 41.

Further, a fourth opening 14b is formed in the upper nonmagnetic insulating layer 14 between the second lead 17 and the upper magnetic shielding layer 15. A fourth resistor element 42 is filled in the fourth opening 14b. Therefore the second lead 17 and the upper magnetic shielding layer 15 can be electrically connected to each other via the fourth resistor element 42.

The third resistor element 41 has the same configuration as the first resistor element 18, and the fourth resistor element 42 has the same configuration as the second resistor element 19.

In this event, a resultant distance L1 of a first electric route S1 which passes through a first electrode pad 31, the first lead 16, the first resistor element 18, the lower magnetic shielding layer 11, the third resistor element 41, the second lead 17, and a second electrode pad 32 is set shorter than a resultant distance L2 of a second electric route S2 which passes through the first electrode pad 31, the first lead 16, the magnetoresistive device 13, the second lead 17, and a second electrode pad 32. Besides, a resultant resistance value R1 of the first electric route S1 is set about 100 times higher than a resultant resistance value R2 of the second electric route S2.

Still further, a resultant distance L3 of a third electric route S3 which passes through the first electrode pad 31, the first lead 16, the second resistor element 19, the upper magnetic shielding layer 15, the fourth resistor element 42, the second lead 17, and the second electrode pad 32 is set shorter than the resultant distance L2 of the second electric route S2 which passes through the first electrode pad 31, the first lead 16, the magnetoresistive device 13, the second lead 17, and the second electrode pad 32. In addition, a resultant resistance value R3 of the third electric route S3 is set about 100 times higher than the resultant resistance value R2 of the second electric route S2.

In the MR magnetic head having the foregoing configuration, even if extremely large static electricity is applied to the first electrode pad 31, for example, such static electricity can be discharged to the second electrode pad 32 via the first electric route S1 or the third electric route S3.

This is because the static electricity is not discharged via the electric route having the smallest resultant resistance but via the electric route having the shortest resultant distance. However, if the resultant electric resistance of the shortest distance between the first electrode pad 31 and the second electrode pad 32 becomes infinite, the static electricity easily moves through the second electric route S2 including the magnetoresistive device 13. Accordingly, it is preferable that respective resultant electric resistances of the first and third electric routes S1, S3 are no more than several MΩ at their maximum.

In such a situation that the MR magnetic head is used to reproduce the signal, an electric current which flows through the magnetoresistive device 13 of the MR head 10 via the first and second leads 16, 17 is about 8 mA, for example. Therefore, if the resultant electric resistances of the first and third electric routes S1, S3 are made too small, a current flowing through the magnetoresistive device 13 becomes small, so that it is possible that a magnetic field signal detectivity of the magnetoresistive device 13 is lowered. However, if the resultant resistance value R3 of the first electric route S1 or the third electric route S3 is set about 100 times higher than the resistance value of the magnetoresistive device 13, the magnetic field signal detectivity of the magnetoresistive device 13 is hardly degraded since the current flowing through the magneto-resistive device 13 is reduced merely by no more than 1%. For this reason, there is no trouble in practical use because loss in efficiency of the magnetoresistive device 13 is less than 1%.

It is preferable that, since the resistance value of the magnetoresistive device 13 becomes 20 to 40Ω, the resistance value of the first electric route S1 or the third electric route S3 is 2000 to 4000Ω or more.

From the explanation of the first embodiment, it would be evident that such configuration of the second embodiment is also effective to prevent dielectric breakdown of the lower and upper nonmagnetic layers 12, 14.

Although the resistors for preventing electrostatic discharge damage are buried in both the lower nonmagnetic layer 12 and the upper nonmagnetic layer 14 in the above configuration, either of the lower and upper resistors for preventing electrostatic discharge damage may be omitted.

Third Embodiment

Figure 12:
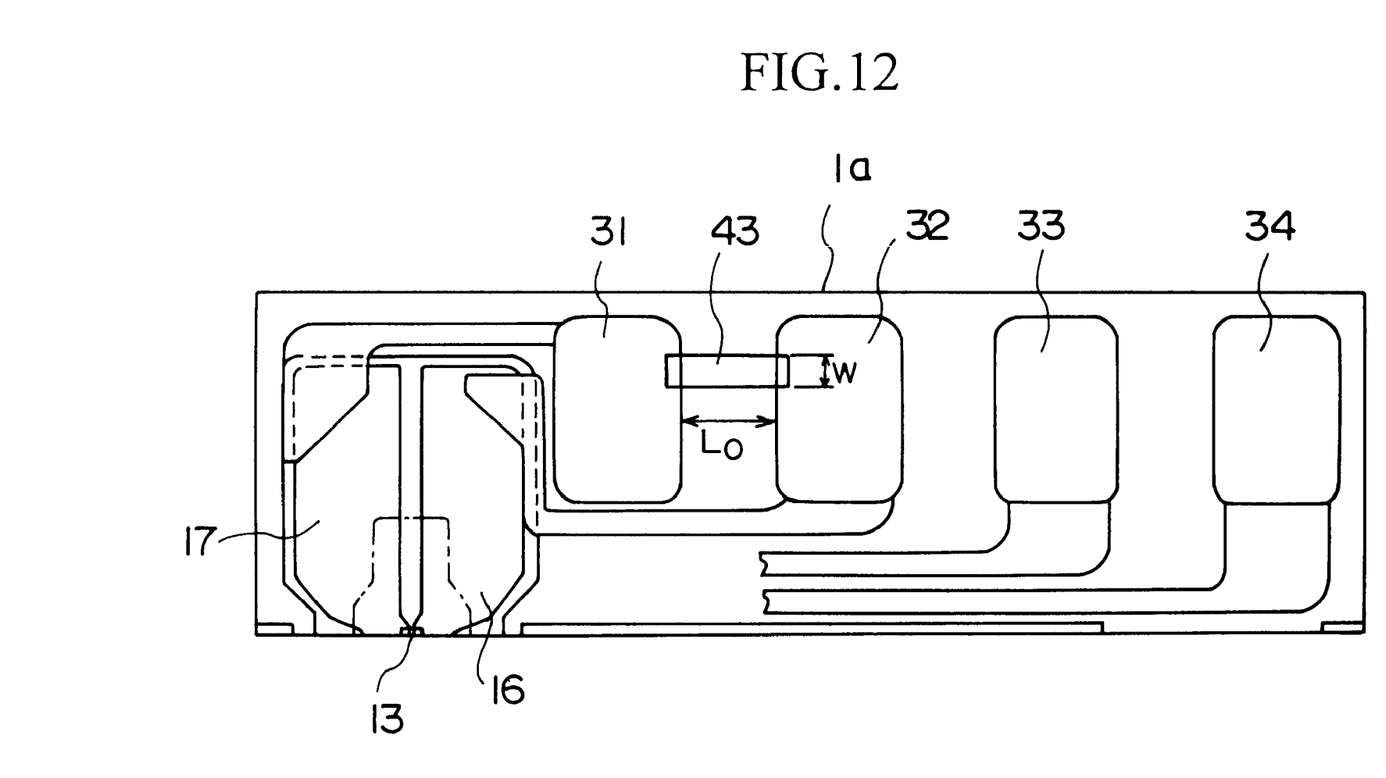
FIG. 12 is a rear end view showing an end surface of a slider of a magnetoresistive head according to a third embodiment of the present invention, wherein the induction type head is omitted.

As another configuration to prevent destruction of the magnetoresistive device because of large static electricity, a configuration shown in FIG. 12 will be proposed by the inventors of the present invention.

FIG. 12 is a view showing an end surface of a slider of a magnetoresistive head when it is viewed from the rear end side. The magnetoresistive device 13 which is attached to the rear end of the head slider 1a is connected to the first electrode pad 31 and the second electrode pad 32 via the first and second leads 16, 17 provided on both sides thereof. Also, the first electrode pad 31 and the second electrode pad 32 are connected to each other via the electrostatic breakdown preventing resistor element 43.

The electrostatic breakdown preventing resistor element 43 is formed to have a resistance value which is 100 times higher than the resistance value of the electric route which passes through the first lead 16, the magnetoresistive device 13, and the second lead 17. Also, the shortest distance L0 between the first electrode pad 31 and the second electrode pad 32 is set shorter than the resultant distance L2 of the route which passes through the first lead 16, the magnetoresistive device 13, and the second lead 17.

For the purposes of example, the shortest distance L0 between the first electrode pad 31 and the second electrode pad 32 is less than 100 μm, and the resultant distance L2 of the route including the magnetoresistive device 13 is approximately 1500 μm. The resultant distance L1 is shorter than the resultant distance L2. In the region including the shortest distance L0 between the first electrode pad 31 and the second electrode pad 32, the electrostatic breakdown preventing resistor element 43 made of NiFe is formed to have a width 1.5 μm and a thickness 0.02 μm. Since a resistivity of NiFe is 20 Ω·cm, a resistance value of the electrostatic breakdown preventing resistor element 43 between the first electrode pad 31 and the second electrode pad 32 is about 2 kΩ. This resistance value may be applied in case the resistance value of the magnetoresistive device 13 is 2Ω.

In the MR magnetic head 10 constructed as above, for example, even if the extremely large static electricity is applied to the first electrode pad 31, such static electricity can be discharged to the second electrode pad 32 via the electrostatic breakdown preventing resistor element 43 located in the electric route having the shortest distance between the first electrode pad 31 and the second electrode pad 32. This is because the static electricity is not discharged via the electric route having the smallest resultant resistance but via the electric route having the shortest resultant distance. However, if the electrostatic breakdown preventing resistor element 43 does not exist and also the electric resistance having the shortest distance between the first electrode pad 31 and the second electrode pad 32 becomes infinite, the static electricity is easy to pass through the electric circuit including the magnetoresistive device 13. Accordingly, it is preferable that the resistance value of the electrostatic breakdown preventing resistor element 43 located in a region of the shortest distance L0 between the first electrode pad 31 and the second electrode pad 32 is set to no more than several MΩ.

As material for the electrostatic breakdown preventing resistor element 43, such material having a large resistivity rather than NiFe, e.g., tungsten, tantalum, or the like may be employed. Besides, a film thickness and a width of the electrostatic breakdown preventing resistor element 43, and the shortest distance L0 between the first electrode pad 31 and the second electrode pad 32 are determined according to constituent material and the resistance value of the electrostatic breakdown preventing resistor element 43.

In such a situation that the MR magnetic head 10 is used to reproduce the signal, an electric current which flows through the magnetoresistive device 13 of the MR head 10 via the first and second leads 16, 17 is about 8 mA, for example. Therefore, if the electric resistance of the electrostatic breakdown preventing resistor element 43 is made too small, a current flowing through the magnetoresistive device 13 becomes small, whereby sometimes a magnetic field signal detectivity of the magnetoresistive device 13 is degraded. However, in the third embodiment, if the electric resistance of the electrostatic breakdown preventing resistor element 43 is set about 100 times higher than the resistance value of the magnetoresistive device 13, a detectivity of the magnetic field signal in the magnetoresistive device 13 is hardly degraded since the current flowing through the magnetoresistive device 13 is reduced by no more than 1% in contrast to the case where no electrostatic breakdown preventing resistor element is provided. For this reason, a sensitivity of the magnetoresistive device 13 is seldom reduced and therefore no trouble is caused in practical use because loss in efficiency of the magnetoresistive device 13 is less than 1%.

Incidentally, although the case has been explained wherein the above MR magnetic head is attached to the magnetic disk drive, the MR magnetic head may be applied to an apparatus which is used to reproduce the magnetic signal recorded on the magnetic tape.

Various modifications will become possible for those skilled in the art after receiving the teachings of the present disclosure without departing from the scope thereof.

What is claimed is:

1. A magnetic head comprising;
  a first magnetic shielding layer formed on an underlying layer;
  a first nonmagnetic insulating layer from on said first magnetic shielding layer;
  a magnetoresistive device formed on said first nonmagnetic insulating layer;
  a first lead and a second lead formed on said first nonmagnetic insulating layer and connected to both sides of said magnetoresistive device, respectively;
  a second nonmagnetic insulating layer formed to cover said first and second leads and said magnetoresistive device;
  a second magnetic shielding layer formed on said second nonmagnetic insulating layer and positioned above said magnetoresistive device; and
  a resistor element buried in at least one of said first and second nonmagnetic insulating layers with one end making electrical connection with said first lead and the other end making electrical connection with the magnetic shielding layer in contact with the nonmagnetic insulating layer in which the resistor element is buried, said resistor element having a smaller electric resistivity than each of said nonmagnetic insulating layers.

2. The magnetic head as set forth in claim 1, wherein said resistor element is buried in an opening having an area of about 100 $\mu m^2$ formed in one of said first and second nonmagnetic insulating layers, and has an electric resistance value of 100 kΩ to 10 MΩ.

3. The magnetic head as set forth in claim 2, wherein said resistor element is made of nichrome, constantan, or manganese.

4. The magnetic head as set forth in claim 1, wherein said magnetoresistive device is made in the form of an isotropic magnetoresistive device or a spin valve magnetoresistive device.

5. The magnetic head as set forth in claim 1, wherein each of said first and second magnetic shielding layers is made of nickel-iron, and each of said first and second nonmagnetic insulating layers is made of aluminum oxide.

6. A magnetic head comprising:
  a first magnetic shielding layer formed on an underlying layer;
  a first nonmagnetic insulating layer formed on said first magnetic shielding layer;
  a magnetoresistive device formed on said first nonmagnetic insulating layer,
  a first lead and a second lead formed on said first nonmagnetic insulating layer and connected to both sides of said magnetoresistive device, respectively;
  a second nonmagnetic insulating layer formed to cover said first and second leads and said magnetoresistive device;
  a second magnetic shielding layer formed on said second nonmagnetic insulating layer and positioned above said magnetoresistive device;
  a plurality of resistor elements buried in at least one of said first and second nonmagnetic insulating layers, with one end of the resistor element making electrical connection with the magnetic shielding layer in contact with the nonmagnetic insulating layer in which the resistor element is buried, and the other end of each resistor element making electrical connection with one of said first and second leads, such that both of said first and second leads are connected to a resistor element;
  a first electrode pad electrically connected to said first lead;
  a second electrode pad electrically connected to said second lead,
  wherein a resultant electric resistance value of a first route which passes through said first lead, said first magnetic shielding layer and said second lead via said plurality of resistor elements, or a resultant electric resistance value of a second route which passes through said first lead, said second magnetic shielding layer and said second lead via said plurality of resistor elements, is set to be about 100 times higher than a resultant electric resistance value of a third route which passes through said first lead, said magnetoresistive device and said second lead.

7. The magnetic head as set forth in claim 6, wherein each of said plurality of resistor elements is buried in an opening having an area of about 100 $\mu m^2$ formed in one of said first and second nonmagnetic insulating layers, and has an electric resistance value of 100 kΩ to 10MΩ.

8. The magnetic head as set forth in claim 7, wherein each of said plurality of resistor elements is made of nichrome, constantan, or manganese.

9. The magnetic head as set forth in claim 6, wherein said magnetoresistive device is made in the form of an isotropic magnetoresistive device or a spin valve magnetoresistive device.

10. The magnetic head as set forth in claim 6, wherein each of said first and second magnetic shielding layers is made of nickel-iron, and each of said first and second nonmagnetic insulating layers is made of aluminum oxide.

11. A magnetic recording/reproducing apparatus comprising:

a magnetic head;

a magnetic recording medium positioned to oppose said magnetic head; and said magnetic head including;

a first magnetic shielding layer formed on an underlying layer;

a first nonmagnetic insulating layer formed on said first magnetic shielding layer;

a magnetoresistive device formed on said first nonmagnetic insulating layer;

a first lead and a second lead formed on said first nonmagnetic insulating layer and connected to both sides of said magnetoresistive device, respectively;

a second nonmagnetic insulating layer formed to cover said first and second leads and said magnetoresistive device;

a second magnetic shielding layer formed on said second nonmagnetic insulating layer and positioned above said magnetoresistive device; and a resistor element buried in at least one of said first and second nonmagnetic insulating layers with one end making electrical connection with said first lead and the other end making electrical connection with the magnetic shielding layer in contact with the nonmagnetic insulating layer in which the resistor element is buried, said resistor element having a smaller electric resistivity than each of said nonmagnetic insulating layers.

* * * * *

UNITED STATES PATENT AND TRADEMARK OFFICE
CERTIFICATE OF CORRECTION

PATENT NO. : 5,978,181
DATED : November 2, 1999
INVENTOR(S) : Niijima et al.

It is certified that error appears in the above-identified patent and that said Letters Patent is hereby corrected as shown below:

<u>Claims</u>:
In claim 6, line 19, delete "the" and insert --each-- therefor

Signed and Sealed this

Third Day of July, 2001

Attest:

*Attesting Officer*

NICHOLAS P. GODICI
*Acting Director of the United States Patent and Trademark Office*